US007088225B2

(12) United States Patent
Yoshioka

(10) Patent No.: US 7,088,225 B2
(45) Date of Patent: *Aug. 8, 2006

(54) EMERGENCY INFORMATION TERMINAL AND EMERGENCY INFORMATION SYSTEM INCLUDING TERMINAL

(75) Inventor: Kenji Yoshioka, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/284,245

(22) Filed: Nov. 21, 2005

(65) Prior Publication Data

US 2006/0071804 A1 Apr. 6, 2006

Related U.S. Application Data

(62) Division of application No. 09/922,392, filed on Aug. 3, 2001, now Pat. No. 7,034,705.

(30) Foreign Application Priority Data

Aug. 4, 2000 (JP) ............................ 2000-237048
Aug. 31, 2000 (JP) ............................ 2000-263473
Apr. 3, 2001 (JP) ............................ 2001-104794

(51) Int. Cl.
*B60R 25/10* (2006.01)

(52) U.S. Cl. ...................... 340/428; 340/506; 340/635; 340/636.1; 340/438; 340/901

(58) Field of Classification Search ................ 340/428, 340/539.1, 506, 508, 636.1, 635, 438, 426.1, 340/825.69, 825.72, 901, 990; 455/333, 455/456

See application file for complete search history.

(56) References Cited

U.S. PATENT DOCUMENTS

| | | | | |
|---|---|---|---|---|
| 5,051,730 | A | 9/1991 | Kulzer | |
| 5,343,077 | A * | 8/1994 | Yoshida et al. | 340/5.64 |
| 6,427,072 | B1 * | 7/2002 | Reichelt | 455/404.1 |
| 6,674,362 | B1 | 1/2004 | Yoshioka et al. | |

FOREIGN PATENT DOCUMENTS

| | | |
|---|---|---|
| DE | 39 32 437 C1 | 10/1990 |
| JP | 59-86413 | 6/1984 |
| JP | 61-52439 | 4/1986 |
| JP | 3-86028 | 4/1991 |
| JP | 5-252673 | 9/1993 |
| JP | 06-70444 | 3/1994 |
| JP | 08-065194 | 3/1996 |
| JP | 08-065918 | 3/1996 |
| JP | 8-287386 | 11/1996 |
| JP | 09-128065 | 5/1997 |
| JP | 09-312937 | 12/1997 |
| JP | 10-304596 | 11/1998 |
| JP | 11-122701 | 4/1999 |
| JP | 2000-108822 | 4/2000 |
| JP | 30-70846 | 8/2000 |

* cited by examiner

*Primary Examiner*—Hung Nguyen
(74) *Attorney, Agent, or Firm*—RatnerPrestia

(57) ABSTRACT

An emergency information terminal includes two power supply circuits supplying power to the internal circuits including a controller. If one of the power supply circuits fails, the other power supply circuit supply power, and the operation of the terminal is maintained. Even in case of emergency such as traffic accident or sickness, an emergency call can be notified. Further, the controller detects a trouble in the power supply circuit, and informs the user of the trouble.

9 Claims, 10 Drawing Sheets

EMERGENCY INFORMATION TERMINAL AND EMERGENCY INFORMATION SYSTEM INCLUDING TERMINAL

This application is a divisional of U.S. patent application Ser. No. 09/922,392, filed Aug. 3, 2001 now U.S. Pat. No. 7,034,705.

FIELD OF THE INVENTION

The present invention relates to an emergency information terminal, mounted on a vehicle, having a function of transmitting data such as vehicle position information to the emergency information center in case of emergency, and to an emergency information system including the emergency information terminal, and more particularly to a power supply circuit for operating the emergency information terminal.

BACKGROUND OF THE INVENTION

An emergency information terminal which is known has emergency information communicating means and is mounted on an automobile or other vehicle, for placing a telephone call to the center supervising the emergency information system such as police or emergency information center through a base station of a communication operator or the like.

For the conventional emergency information terminal, a device for feeding power source into the emergency information terminal by power supply from a main battery or auxiliary battery is proposed. For example, Japanese Laid-open Patent No. 8-287386 discloses power supply from car-mount battery and back-up power source from a large-capacity capacitor. Japanese Laid-open Patent No. 2000-108822 proposes a power supply device feeding from car-mount battery and a power supply device by battery of a cellular phone. The power source control unit of the conventional emergency information terminal inspects the internal circuit of the emergency information terminal periodically and automatically, and informs an user of detection of abnormality in part of the internal circuit. The conventional terminal is operated by the power supply from the power supply circuit in case of emergency, places a telephone call automatically to the emergency information center, and transmits the position information. Then, the position of the vehicle when starting the emergency information process is notified to the emergency information center.

In the conventional emergency information terminal, even if the power source is available in two lines, the power supply circuit is prepared in one line only. Accordingly, if the power supply circuit fails, power supply to the emergency information terminal is cut off, and power supply to the controller for controlling the operation of the terminal is also cut off. As a result, failure of power source cannot be noticed to the user, and emergency call cannot be made in case of emergency.

The conventional emergency information terminal generates a power source for each block in the power source circuit in the terminal, supplies power source to the internal circuit, and also feeds to an external device.

Further, in the conventional emergency information terminal, a power to the inside and a power to external device are supplied from the same power source. Accordingly, in case of drop of supply voltage due to abnormality of consuming a large current such as failure in external device or breakage or short circuit of power supply line, the voltage drops also in the power supply line to the internal circuit connected to the power supply line, and an operation of the emergency information terminal cannot be maintained.

SUMMARY OF THE INVENTION

An emergency information terminal mounted on a vehicle has a main battery for placing an emergency call to the center supervising the emergency information system, and having two power supply circuits connected to the main battery for supplying power source.

In case of failure of power supply circuit, an operation of the emergency information terminal is maintained.

Another emergency information terminal mounted on a vehicle, having an external device and a power source control device, for placing an emergency call to the center supervising the emergency information system, feeds power source to the external device, and cuts off supply of the power source.

In case of failure of external device, or short circuit or abnormality of power supply line, an operation of the emergency information terminal can be continued.

DESCRIPTION OF THE PREFERRED EMBODIMENTS

Embodiment 1

Figure 1:
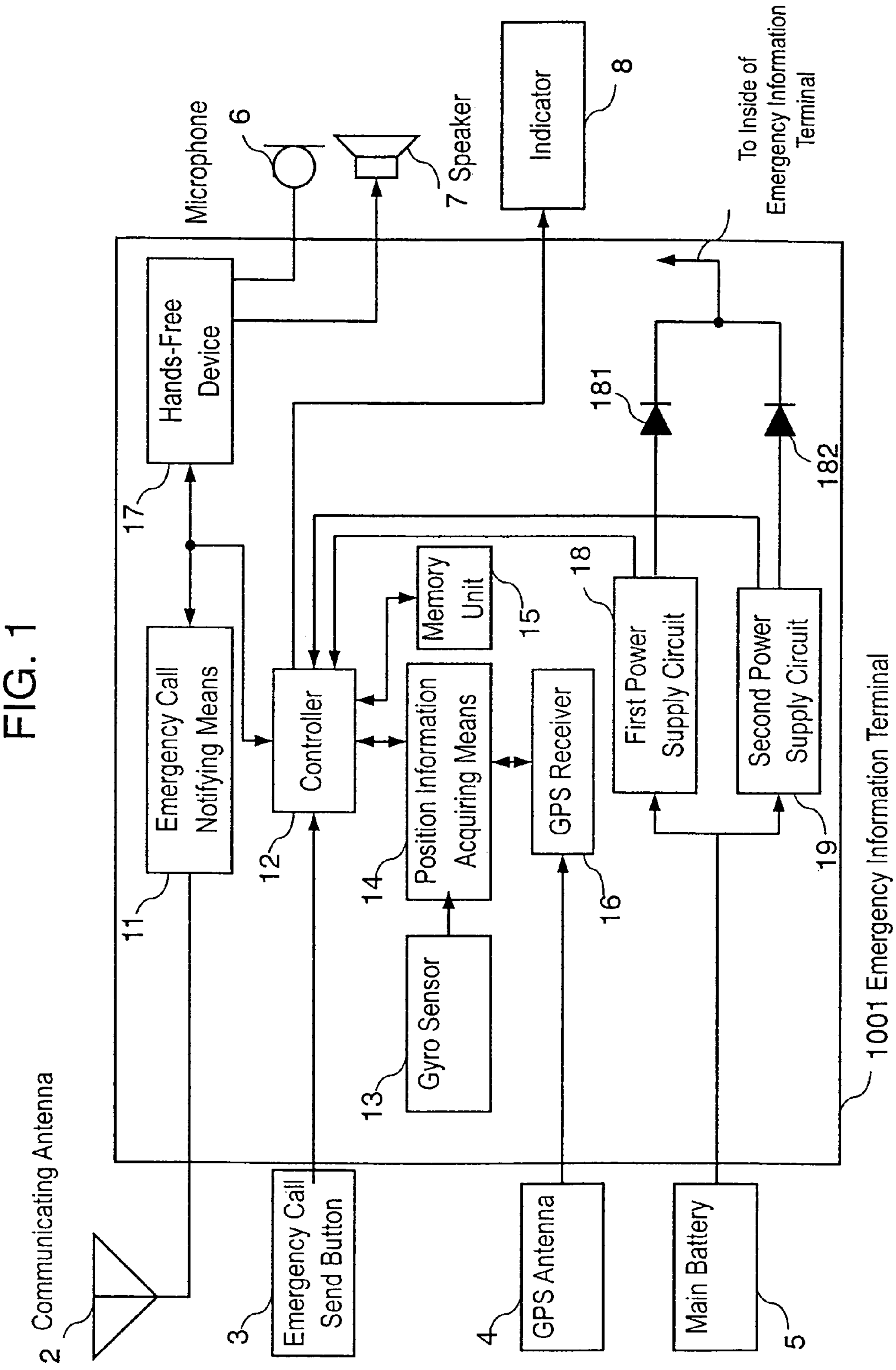
FIG. 1 is a block diagram of an emergency information terminal according to embodiment 1 of the invention.

FIG. 1 shows an emergency information terminal 1001 in embodiment 1 of the invention. The terminal 1001 is mounted in a car or other vehicle, and transmits data of present position information of the vehicle or registered vehicle to the center supervising the emergency information system such as police or emergency information center in case of emergency such as traffic accident or sickness, and requests dispatch of an emergency vehicle. A communicating antenna 2 sends a transmission signal from emergency call notifying means 11 to a base station of a communication operator, and issues a signal received from the communication operator to the emergency call notifying means 11. An emergency call send button 3 is pressed by a user in case of emergency such as traffic accident or sickness, and generates a signal for starting processing of emergency call transmission. A GPS antenna 4 is for receiving data from a GPS satellite. A main battery 5 supplies power to the electric appliances in the vehicle, and also supplies power to the emergency information terminal 1001. A microphone 6 may be a microphone module incorporating a microphone for sending an user's voice to the emergency information terminal 1001 when notifying a voice talk in emergency call notifying process, and an amplifying circuit and others. A speaker 7 outputs a received voice signal from the emergency information center when notifying the voice talk. An indicator 8 is information transmitting means such as lighting device to inform the user of an operating state of the emergency information terminal 1001 such as normal, abnormal, or emergency call notifying state.

In the emergency information terminal 1001, the emergency call notifying means 11, upon receiving a call request signal from a controller 12, starts a telephone call process to a destination corresponding to the telephone number, according to the telephone number entered from the controller 12, through the base station of the communication operator. When receiving a response from the destination or a signal transferring to talk such as busy signal, the operation is transferred to the voice talk control or data communication control, and a signal notifying transfer to talk is issued to the controller 12. A vehicle running direction or the like, position information and other data entered from the controller 12 are transmitted to the center or the destination corresponding to the telephone number through the base station of the communication operator or the like.

The controller 12 controls to record data such as position information acquired from a position information acquisition processor 14, history data showing operating status of emergency call notifying process, and failure history data of failure occurring in the emergency information terminal 1001, in a memory unit 15. With an operation signal from the emergency call send button 3, an emergency call request is recognized, and the data of position information or the like acquired from the position information acquisition processor 14 and recorded in the memory unit 15 are entered. Further, the telephone number of the center is obtained from the memory unit 15. Using this telephone number, a telephone call is requested to the emergency call notifying means 11. Further, from the emergency call notifying means 11, when a response signal from the destination corresponding to the telephone number or a signal transferring to talk such as busy signal is received, transfer to talk state is recognized. Moreover, a signal for transmitting the position information and history data obtained from the position information acquisition processor 14 to the center or the destination corresponding to the telephone number is issued to the emergency call notifying means 11 through the base station of the communication operator or the like.

A gyro sensor 13 generates information of a vehicle running direction or the like. The position information acquisition processor 14 issues the data from the gyro sensor 13, and the position information and other data generated from the data received from the GPS antenna 4 by a GPS receiver 16, to the controller 12. The memory unit 15 records the center telephone number, the registration number of the vehicle mounting the emergency information terminal 1001, a device own ID, position information generated in the position information acquisition processor 14 and other information, and issues the recorded data according to a request signal from the controller 12. The GPS receiver 16 issues the position information and other data to the position information acquisition processor 14, according to the data obtained from the GPS antenna 4. A hands-free device 17, for realizing hands-free voice talk in case of emergency call notifying process by signal processing and level adjusting function, processes the transmission voice signal from the user in voice talk and the voice signal of the voice signal received from the center by echo canceling and howling preventing process. A first power supply circuit 18 supplies power to an internal circuit of the emergency information terminal 1001. A second power supply circuit 19 supplies power to an internal circuit of the emergency information terminal 1001. In the invention, the circuits incorporated in the emergency information terminal are generally called internal circuits. A first diode 181 issues the supply source from the first power supply circuit 18 into the emergency information terminal 1001, and prevents the supply circuit from receiving power supply from the second power supply circuit 19. A second diode 182 issues the supply source from the second power supply circuit 19 into the emergency information terminal 1001, and prevents the second power supply circuit from receiving power supply from the first power supply circuit 18.

an operation of the emergency information terminal in embodiment 1 of the invention having such configuration will be is explained below. In FIG. 1, the first power supply circuit 18 and second power supply circuit 19 generate power source for the internal circuits of the emergency information terminal 1001 from the power supply from the main battery 5. The power source generated from the first power supply circuit 18 is supplied into the internal circuit of the emergency information terminal 1001 through the first diode 181. The second diode 182 protects the second power supply circuit 19 from entry of current into the circuit. The power source generated from the second power supply circuit 19 is supplied into the internal circuit of the emergency information terminal 1001 through the second diode 182. The first diode 181 protects the first power supply circuit 18 from entry of current into the circuit.

The power source is supplied and allows the emergency information terminal 1001 and the controller 12 for controlling the operation of the emergency information terminal 1001 to operate.

In the power supplied state, usually except for emergency call notifying process time, the position information acquisition processor 14 generates position information data from data from the gyro sensor 13 and data received in the GPS receiver 16 from the GPS antenna 4. The controller 12 periodically acquires position information and other data from the position information acquisition processor 14, and records the data in the memory unit 15.

The user presses the emergency call send button 3 in case of emergency such as traffic accident or sickness. When being pressed, the emergency call send button 3 issues a corresponding signal to the controller 12. The controller 12 recognizes the emergency call send request from an operation signal from the emergency call send button 3, and starts emergency call notifying process.

The emergency call notifying process may start by detecting operation of impact sensor, air bag sensor, or tumble sensor as a trigger.

The controller 12 connects a signal path between the emergency call notifying means 11 and controller 12. The controller 12 acquires the position information, center telephone number and other data stored in the memory unit 15, and requests telephone call to the emergency call notifying means 11 by using the telephone number.

Through the communicating antenna 2, the emergency call notifying means 11 starts telephone call process to the destination corresponding to the telephone number through the base station of the communication operator or the like.

The emergency call notifying means 11, when receiving a response from the destination or a signal transferring to talk such as busy signal, recognizes transfer to talk state, and transfers to the voice talk or data communication, and issues a signal telling transfer to talk to the controller 12. The controller 12, upon judging that the talk is successful, transmits data such as position information acquired from the memory unit 15 to the center or the destination corresponding to the telephone number through the base station of the communication operator or the like. That is, the present position, running history information, device ID, registration number, and registered car name are transmitted.

At the center, when receiving all position information data from the emergency information terminal 1001, is set in a mode for voice talk. The emergency call notifying means 11 incorporated in the emergency information terminal 1001, upon receiving a signal indicating a transfer to the voice talk, issues a signal indicating a transfer to the voice talk to the controller 12. The controller 12, upon receiving the signal telling transfer to voice talk, controls to connect the voice path of the emergency call notifying means 11 and hands-free device 17, and transfers a voice to the voice talk notifying process.

In voice talk notifying process, the emergency call notifying means 11 issues a voice signal received from the center to the hands-free device 17. The hands-free device 17, through the internal signal processing circuit, acquires the voice level and frequency characteristic from the received voice signal, and raises the voice level of the received voice signal, and issues the signal to the speaker 7. The speaker 7 outputs the received voice signal entered from the hands-free device 17 to tell the user.

The microphone 6, upon acquiring the voice signal from the user and the received voice signal pronounced from the speaker 7, issues the signal to the hands-free device 17. The hands-free device 17, when receiving a transmission signal having similar signal component as the voice level and frequency characteristic acquired from the received voice signal, judges to be echo component of the received voice signal entered from the microphone 6, and eliminates the echo component. Then, the device 17 issues the signal to the emergency call notifying means 11. The emergency call notifying means 11 receives the transmission voice signal from the hands-free device 17, and transmits it to the center.

When the voice talk notifying process is over, the emergency information terminal 1001 transfers to a call-back waiting state to wait for voice talk call-back from the center. In the call-back waiting state, when voice is entered from the center, the process transfers to automatic incoming and voice talk state, and voice talk notifying process is resumed. If voice is not entered from the center in a predetermined time after transfer to the call-back waiting state, the call-back waiting state is canceled, and the ordinary state is resumed.

The controller 12 receives a signal indicating an operating state such as supply voltage signal from the first power supply circuit 18 or second power supply circuit 19. The controller 12 monitors the signal from the first power supply circuit 18 and second power supply circuit 19. When a voltage drop or other abnormality is detected, the failure history is recorded in the memory unit 15, and a control signal is issued to the indicator 8 to instruct lighting or flickering. The indicator 8 lights or flickers depending on the control signal from the controller 12 to inform the user of any abnormality in the first power supply circuit 18 or second power supply circuit 19. The memory unit 15 also stores the failure history of voltage drop, detection time, and the number of times.

The failure history can be acquired by communication process with the controller 12 by connecting an external device to the outside of the emergency information terminal 1001.

In such configuration, even if one of plural power supply circuits fails, power supply can be continued by the other power supply circuit to the emergency information terminal 1001 and the controller for controlling the emergency information terminal 1001. Therefore, the terminal 1001 informs the user of abnormality of power source circuit, and emergency call notifying process is performed securely even in the emergency case of traffic accident or sickness.

Embodiment 2

Figure 2:
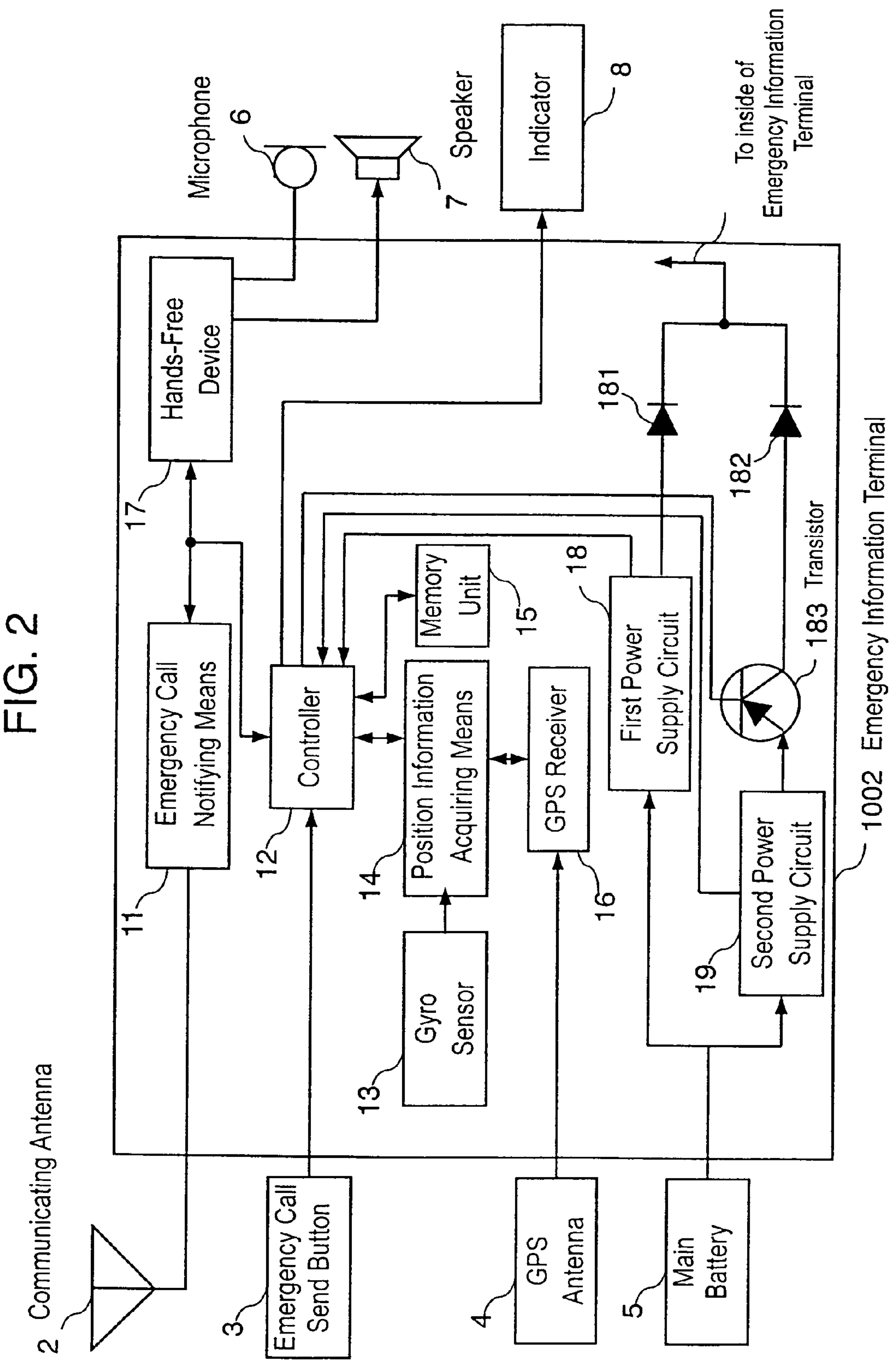
FIG. 2 is a block diagram of an emergency information terminal according to embodiment 2 of the invention.

FIG. 2 shows an emergency information terminal in embodiment 2 of the invention. The terminal 1002 includes two power supply circuits for feeding power, and it is designed to operate by feeding power from one of first power supply circuit 18 and second power supply circuit 19. If one of the first power supply circuit 18 and second power supply circuit 19 fails to feed power, power is supplied from the other of the first power supply circuit 18 and second power supply circuit 19, so that the terminal can operate continuously.

In FIG. 2, what differs from FIG. 1 is that a transistor 183 for on/off control for turning on/off power supply is provided between the second power supply circuit 19 and second diode 182. The transistor 183 is a power transistor for controlling power supply from the second power supply circuit 19.

The first power supply circuit 18 usually supplies power to the internal circuits and controller 12 of the emergency information terminal 1002. Further, the controller 12 monitors a voltage signal from the first power supply circuit 18. If the first power supply circuit 18 fails and power supply is interrupted, the controller 12 detects abnormality such as voltage drop by the voltage signal, and issues a control signal to turn on the transistor 183.

When the transistor 183 is turned on, the power generated in the second power supply circuit 19 is supplied into the internal circuits of the emergency information terminal 1002, so that the operation of the emergency information terminal 1002 can be continued.

Further, for the abnormality of the first power supply circuit 18, the controller 12 issues a control signal to the indicator 8 to control lighting or flickering. The indicator 8 informs the user of abnormality by lighting or flickering the LED by the control signal.

In this configuration, power is usually supplied from one of the plural power supply circuits, while the other power supply circuit may be reserved as a standby. Even if one power supply circuit fails to feed power, power can be supplied from the other power supply circuit, and the operation of the emergency information terminal can be maintained. And emergency call notifying process is performed securely even in the emergency case of traffic accident or sickness.

Embodiment 3

Figure 3:
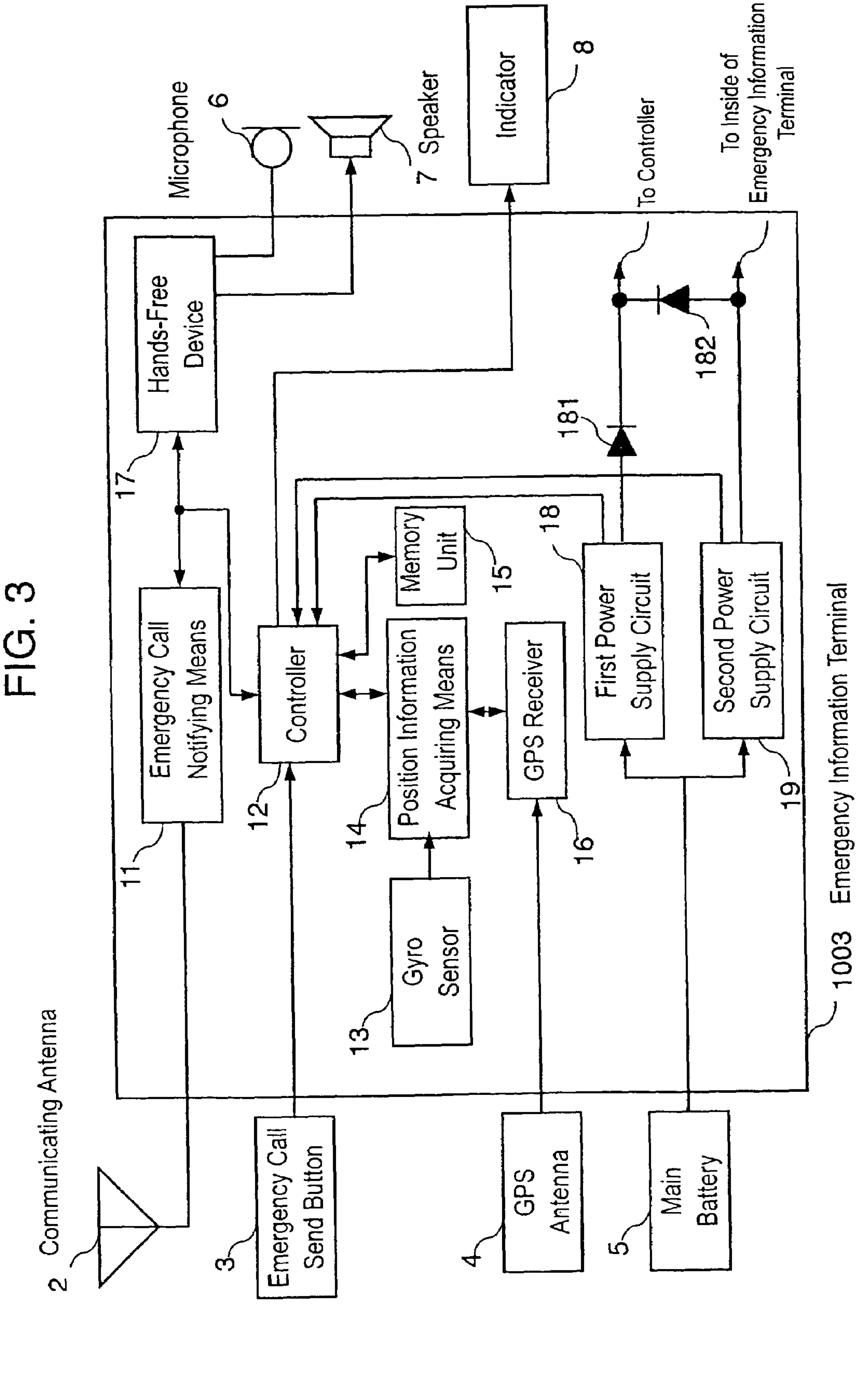
FIG. 3 is a block diagram of an emergency information terminal according to embodiment 3 of the invention.

FIG. 3 shows an emergency information terminal in embodiment 3 of the invention. The terminal includes a power supply circuit for feeding power to internal circuits, and other power supply circuit for feeding power to the controller for controlling an operation of the emergency information terminal.

In FIG. 3, differently from FIG. 1, a first power supply circuit 18 supplies power to the controller 12. A second power supply circuit 19 supplies power to the controller 12, and also supplies power to the internal circuits of the emergency information terminal 1003.

The first power supply circuit 18 usually supplies power to the controller 12, and the second power supply circuit 19 supplies power to the internal circuits and controller 12 of the emergency information terminal 1003. Further, the controller 12 monitors the voltages of the first power supply circuit 18 and second power supply circuit 19. If the first power supply circuit 18 fails and power supply is interrupted, power is supplied to the controller 12 from the second power supply circuit 19, and the operation is continued.

Due to abnormality of the first power supply circuit 18, the controller 12 issues a control signal to the indicator 8 to control lighting or flickering. The indicator 8 having the LED informs the user of abnormality by lighting or flickering by the control signal.

If the second power supply circuit 19 fails and power supply is interrupted, power supply to the emergency information terminal 1003 is interrupted, and the operation cannot be continued. However, the controller 12 continues operation with the power supplied from the first power supply circuit 18.

Due to abnormality of the second power supply circuit 19, the controller 12 issues a control signal to the indicator 8 to control lighting or flickering. The indicator 8 informs the user of abnormality by lighting or flickering by the control signal.

In this configuration, the first power supply circuit 18 for supplying power to the controller 12 may be a power supply circuit of a power saving type. If power supply from the fist power supply circuit 18 to the controller 12 is interrupted, the controller can continue operation, so that the abnormality of the emergency information terminal can be noticed to the user.

Embodiment 4

Figure 4:
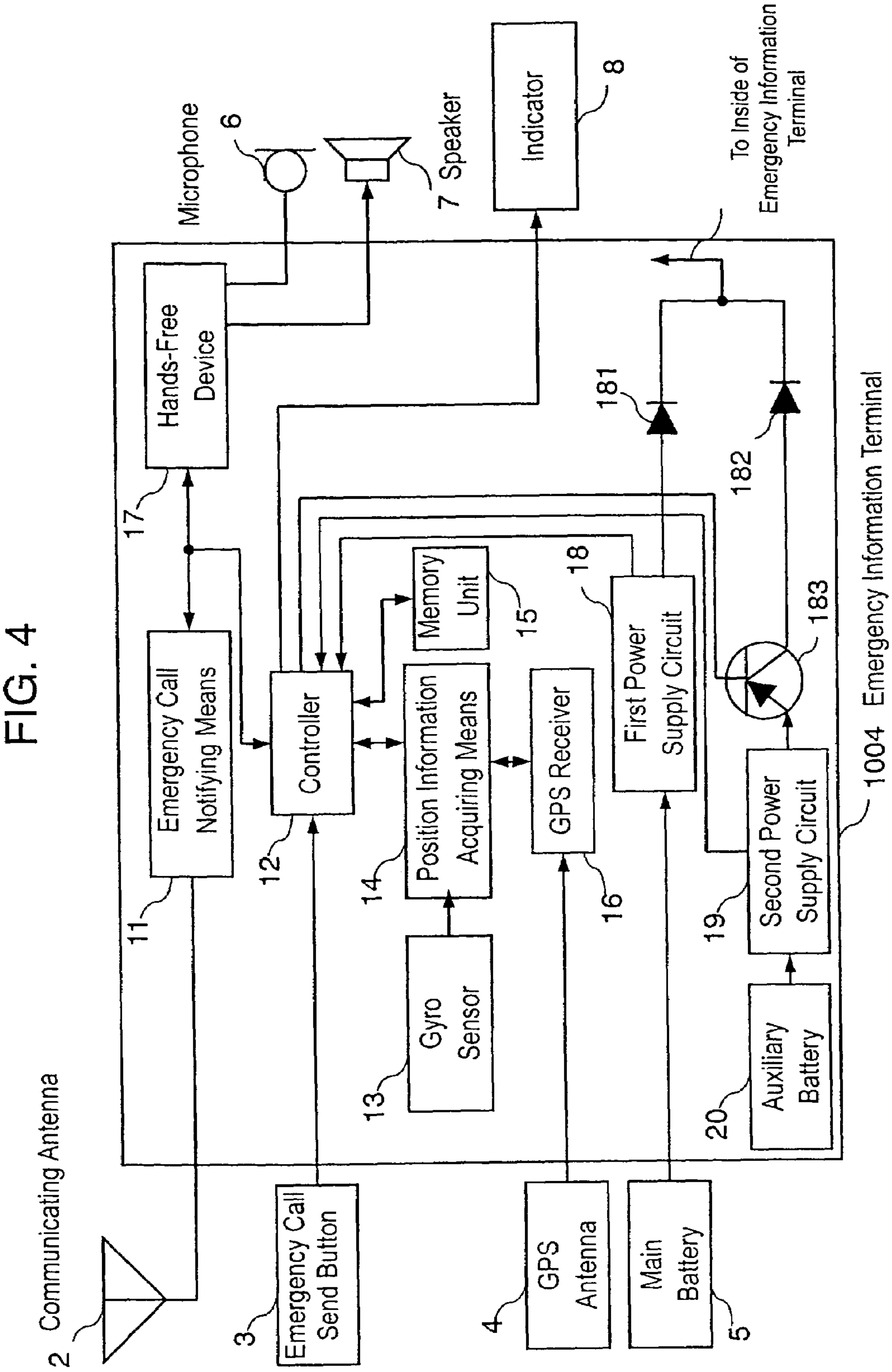
FIG. 4 is a block diagram of an emergency information terminal according to embodiment 4 of the invention.

FIG. 4 shows an emergency information terminal in embodiment 4 of the invention. The terminal includes a power supply circuit which receives power from an existing main battery of the vehicle for feeding power to the terminal, and other power supply circuit which receives power from an auxiliary battery for feeding power to the terminal. The terminal operates as the power is supplied from the power supply circuit for feeding power by receiving power usually from the main battery. If power supply is interrupted due to trouble of the power supply circuit or the like, the terminal can continue to operate with the power from the power supply circuit for feeding power by receiving power from the auxiliary battery.

In FIG. 4, what differs from the terminal 1002 in FIG. 2 is that the terminal 1004 has an auxiliary battery 20, so that the power source to the second power supply circuit 19 is supplied from the auxiliary battery 20. The auxiliary battery 20 is a standby battery for supplying power in case power cannot be supplied due to trouble of the main battery 5 or first power supply circuit 18.

The first power supply circuit 18 usually supplies power to the inner circuits and controller 12 of the emergency information terminal 1004. Further, the controller 12 monitors a voltage signal of the first power supply circuit 18. If the main battery 5 or first power supply circuit 18 fails and power supply is interrupted, the controller 12 detects abnormality such as voltage drop by the voltage signal, and issues a control signal to turn on the transistor 183.

When the transistor 183 is turned on, the second power supply circuit 19 supplies power to the internal circuits of the emergency information terminal 1004, so that the emergency information terminal 1004 can continued to operate.

Further, due to abnormality of the first power supply circuit 18, the controller 12 issues a control signal to the indicator 8 to control lighting or flickering. The indicator 8, having the LED, informs the user of abnormality by lighting or flickering by the control signal.

In this configuration, the terminal 1004 usually operates with power supply from the main battery 5 through the power supply circuit, and the auxiliary battery 20 and other power supply circuit are reserved as standby. In the event of failure of main battery 5 and the first power supply circuit 18 for feeding power from the power supply, the operation of the emergency information terminal 1004 is maintained with the power from the auxiliary battery 20. Therefore, the terminal can execute emergency call notifying process securely even in the emergency case of traffic accident or sickness.

The terminal includes two lines of not only battery but also power supply circuit, and has an operation guaranteed even in the event of trouble of the main battery 5 or power supply circuit. Therefore, even if power supply from the main battery 5 is interrupted, the terminal can continue to operate securely.

Embodiment 5

Figure 5:
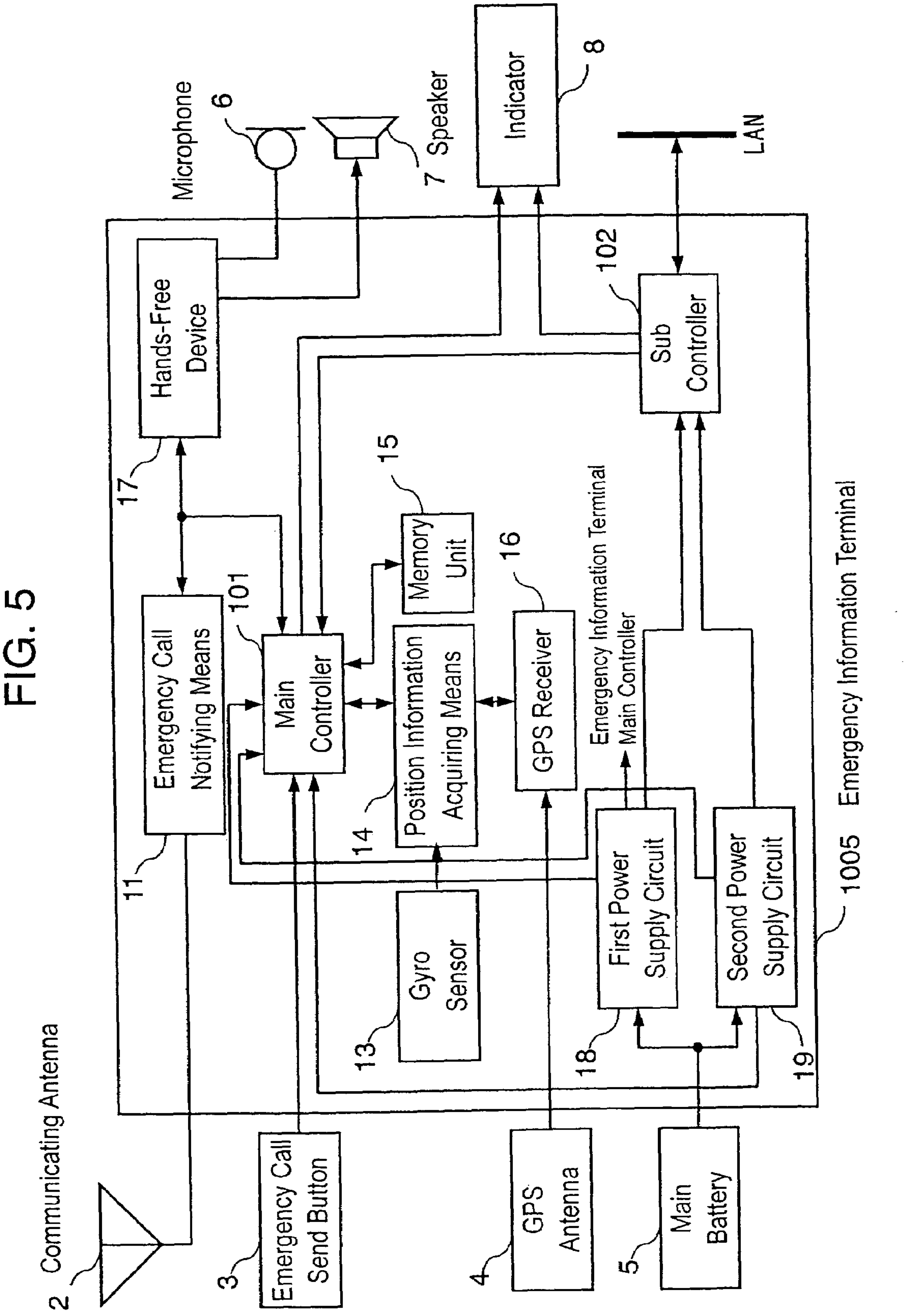
FIG. 5 is a block diagram of an emergency information terminal according to embodiment 5 of the invention.

FIG. 5 shows an emergency information terminal in embodiment 5 of the invention. What differs from FIG. 1 is that the terminal includes a main controller for controlling the entire terminal, and a sub controller for controlling communications of car-mount LAN or the like.

In FIG. 5, emergency call notifying means 11, upon receiving a transmission request signal from the main controller 101, starts telephone call processing to a destination corresponding to the telephone number through the base station of the communication operator by the telephone number entered from the main controller 101. When receiving a response from the destination or a signal transferring to talk such as busy signal, the emergency call notifying means 11 transfers to the voice talk control or data communication control, and issues a signal notifying the transfer to the talk to the main controller 101. The vehicle running direction, position information and other data entered from the main controller 101 are transmitted to the center or the destination corresponding to the telephone number through the base station of the communication operator or the like.

The main controller 101 monitors a supply voltage signal issued from the second power supply circuit 19. When receiving a signal indicating voltage drop from the supply voltage signal, the main controller 101 judges failure, and informs the user of failure by using the indicator 8. Further, the main controller 101 records the position information and other data acquired from the position information acquisition processor 14 in the memory unit 15. Moreover, the main controller 101 recognizes an emergency call request by an operation signal from the emergency call send button 3, and receives the data of position information recorded in the memory unit 15 obtaining from the position information acquisition processor 14 to start emergency call notifying process. In consequence, the main controller 101 acquires the telephone number of the center from the memory unit 15. By this telephone number, telephone call is requested to the emergency call notifying means 11. When a response signal from the destination corresponding to the telephone number or a signal transferring to talk such as busy signal is received from the emergency call notifying means 11, the main controller, the transfer to talk state is recognized. Moreover, the main controller 101 issues a signal for transmitting the position information data including the history of position information data obtained from the position information acquisition processor 14 to the center or the destination corresponding to the telephone number to the emergency call notifying means 11 through the base station of the communication operator or the like.

A gyro sensor 13 generates data of vehicle running direction or the like. The position information acquisition processor 14 outputs the data from the gyro sensor 13, and outputs the position information and other data generated from the data received from a GPS antenna 4 by a GPS receiver 16 to the main controller 101. The memory unit 15 records a center telephone number, a registration number of the vehicle mounting the emergency information terminal 1005, and position information generated in the position information acquisition processor 14, and outputs the recorded data according to a request signal from the main controller 101. The GPS receiver 16 outputs the position information data to the position information acquisition processor 14 based on the data obtained from the GPS antenna 4. A hands-free device 17 performs hands-free voice talk in case of a emergency call notifying process by signal processing and level adjusting function. Then, the device 17 may process the transmission voice signal from the user in voice talk and the voice signal of the voice signal received from the center by echo canceling and howling preventing process.

A first power supply circuit 18 supplies power to an internal circuit of the emergency information terminal 1005 and the main controller 101, and then, issues a signal indicating the supply voltage to the sub controller 102. A second power supply circuit 19 supplies power to the sub controller 102, and issues a signal indicating the supply voltage to the main controller 101. The sub controller 102, which is composed of a microcomputer and others, controls the LAN communications, and issues an air bag state signal entered from the air bag to the main controller 101 through the LAN.

An operation of the emergency information terminal in embodiment 5 of the invention having such configuration will be is explained below. In FIG. 5, the first power supply circuit 18 receives power supply from the main battery 5, and generates power source for the internal circuits of the emergency information terminal 1005, and the main controller 101 for controlling the operation of the emergency information terminal 1005. The second power supply circuit 19 receives power supply from the main battery 5, and generates power source for the sub controller 102 for controlling the communication of the emergency information terminal 1005.

By these power supplies, usually except for emergency call notifying process time, the position information acquisition processor 14 generates position information data from data from the gyro sensor 13 and the data received in the GPS receiver 16 from the GPS antenna 4. The main controller 101 periodically acquires position information and other data from the position information acquisition processor 14, and records in the memory unit 15.

The user presses the emergency call send button 3 in case of emergency such as traffic accident or sickness. When being pressed, the emergency call send button 3 issues a corresponding signal to the main controller 101. The main controller 101 recognizes the emergency call send request by the signal from the emergency call send button 3, and starts emergency call notifying process.

When the sub controller 102 receives a signal requesting automatic emergency call notifying process such as air bag expanding signal through the car-mounted LAN, a signal requesting emergency call automatic transmission is issued to the main controller 101, so that the main controller 101 starts emergency call notifying process.

The main controller 101 acquires the position information data, and center telephone number stored in the memory unit 15, and requests telephone call to the emergency call notifying means 11 according to the telephone number. Through the communicating antenna 2, the emergency call notifying means 11 places a telephone call to the destination corresponding to the telephone number through the base station of the communication operator or the like.

The emergency call notifying means 11, when receiving a response from the destination or a signal transferring to talk such as busy signal, recognizes a transfer to a talk state, transfers to the voice talk control or data communication control, and issues a signal indicating the transfer to talk to the main controller 101. The main controller 101, upon judging the talk is successful, transmits the data including position information of the vehicle to the center, i.e., the destination corresponding to the telephone number through the base station of the communication operator or the like.

At the center, when all position information data from the emergency information terminal 1005 is received, the terminal changes in a mode for voice talk. The emergency call notifying means 11 incorporated in the emergency information terminal 1005 receives a signal indicating a transfer to voice talk, and issues a signal indicating the transfer to voice talk to the main controller 101. The main controller 101 receives the signal indicating the transfer to voice talk, and controls to connect the voice path of the emergency call notifying means 11 and hands-free device 17, and then, transfers the signal to the voice talk notifying process.

In voice talk notifying process, the emergency call notifying means 11 issues the voice signal received from the center to the hands-free device 17. The hands-free device 17, using the internal signal processing circuit, acquires the voice level and frequency characteristic from the received voice signal, and raises the voice level of the received voice signal, and issues the signal to the speaker 7. The speaker 7 outputs the received voice signal entered from the hands-free device 17 to tell the user.

The microphone 6 acquires the voice signal from the user and the received voice signal pronounced from the speaker 7, and issues the signals to the hands-free device 17. The hands-free device 17, when receiving a transmission signal having similar signal component to the voice level and frequency characteristic acquired from the received voice signal, judges to be echo component of the received voice signal entered from the microphone 6. Then, the device 17 eliminates the echo component, and issues the signals to the emergency call notifying means 11. The emergency call notifying means 11 receives the voice signal transmitted from the hands-free device 17, and transmits the signal to the center to enable hands-free voice talk.

The main controller 101 monitors a supply voltage signal from the second power supply circuit 19. When detecting a voltage drop or other abnormality is detected, the controller 101 judges abnormality in the second power supply circuit 19 and the sub controller 102 for acquiring power source from the second power supply circuit 19, and issues a control signal to the indicator 8 to instruct lighting or flickering. The indicator 8 having the LED lights or flickers inform the user of abnormality depending on the control signal from the main controller 101. Further, the sub controller 102 monitors the supply voltage signal from the first power supply circuit 18. When detecting a voltage drop or other abnormality from this signal, the sub controller 102 judges abnormality in the first power supply circuit 18 and the emergency information terminal 1005 and main controller 101 for acquiring power source from the first power supply circuit 18. And the controller 102 issues a control signal to the indicator 8 to instruct lighting or flickering. The indicator 8 having the LED lights or flickers depending on the control signal from the sub controller 102 to inform the user of abnormality.

The voltage of the first power supply circuit 18 is detected by the main controller 101, and a voltage signal of the first power supply circuit 18 is issued from the main controller 101 to the sub controller 102. Therefore, the sub controller 102 can verify the operation of the first power supply circuit 18 and main controller 101. Further, the voltage of the second power supply circuit 19 is detected by the sub controller 102, and a voltage signal of the second power supply circuit 19 is issued to the main controller 101. Therefore, the main controller 101 can verify the operation of the second power supply circuit 19 and sub controller 102.

Further, by mutual communications, the main controller and sub controller monitor each other. If signal from the sub controller is not received, the main controller judges abnormality in the sub controller or the second power supply circuit, and lights or flickers the indicator 8. If signal from the main controller is not received, the sub controller judges abnormality in the main controller or first power supply circuit, and lights or flickers the indicator. When abnormality is detected, not only controlling the indicator, but also the detection time, number of times, and failure description are recorded in the memory unit, so that the cause of abnormality can be analyzed easily.

Thus, even in the cases that one of the two power supply circuits fails, and that the operation of the corresponding controller is stopped, or the operation is stopped due to trouble of the main controller 101 or sub controller 102 itself, the other power supply circuit and other controller continue operation. Therefore, the other controller can detect a trouble of the power supply circuit and controller, and notify the user of the trouble.

Embodiment 6

Figure 6:
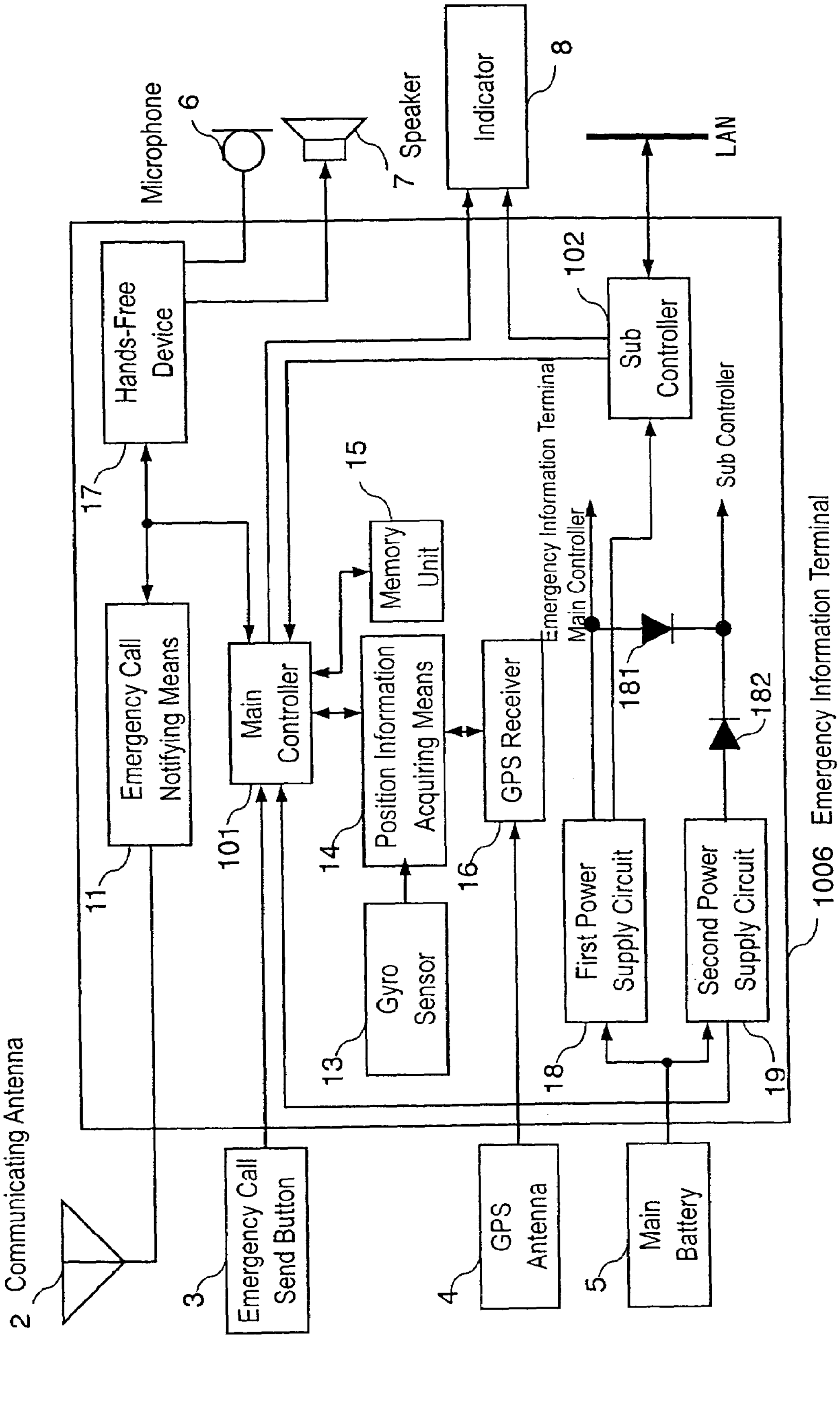
FIG. 6 is a block diagram of an emergency information terminal according to embodiment 6 of the invention.

FIG. 6 shows an emergency information terminal in embodiment 6 of the invention. The terminal has two power supply circuits for supplying power, and one power supply circuit feeds power to all internal circuits in the emergency information terminal including the main controller and sub controller. Other power supply circuit supplies power to the sub controller.

In FIG. 6, different from FIG. 5, the first power supply circuit 18 feeds power also to the sub controller 102. The terminal has a function of preventing entry of current from the first power supply circuit 18 into the second power supply circuit 19, and preventing entry of current from the second power supply circuit 19 into the first power supply circuit 18.

In FIG. 6, the first power supply circuit 18 receives power from the main battery 5, and generates power for the internal circuits of the emergency information terminal 1006, main controller 101 for controlling the operation of the terminal 1006, and sub controller 102 for controlling communications such as air bag expansion signal input from the car-mounted LAN. The second power supply circuit 19 receives power from the main battery 5, and generates power for the sub controller 102.

The main controller 101 monitors a supply voltage signal issued from the second power supply circuit 19. When receiving a signal indicating voltage drop or other abnormality from this signal, the main controller 101 judges abnormality in the second power supply circuit 19, and issues a control signal to the indicator 8 to light or flicker. Having the LED, the indicator 8 lights or flickers according to the control signal from the main controller 101, and informs the user of the abnormality. The sub controller 102 monitors a supply voltage signal issued from the first power supply circuit 18. The sub controller 102, when receiving a signal indicating voltage drop or other abnormality from this signal, judges abnormality in the first power supply circuit 18 and the emergency information terminal 1006 and main controller 101 receiving power source from the first power supply circuit 18, issues a control signal to the indicator 8 to light or flicker. Having the LED, the indicator 8 lights or flickers according to the control signal from the sub controller 102 to inform the user of abnormality.

Thus, by supply of power from the power source circuit, power is supplied also to the sub controller, and failure of operation of the sub controller due to power source trouble can be avoided, and abnormality can be securely detected by monitoring of the sub controller, so that the user is informed of abnormality. Moreover, counterflow of current is prevented because entry of current from the first power supply circuit 18 into the second power supply circuit 19 is prevented, and also entry of current from the second power supply circuit 19 into the first power supply circuit 18 is prevented.

Embodiment 7

Figure 7:
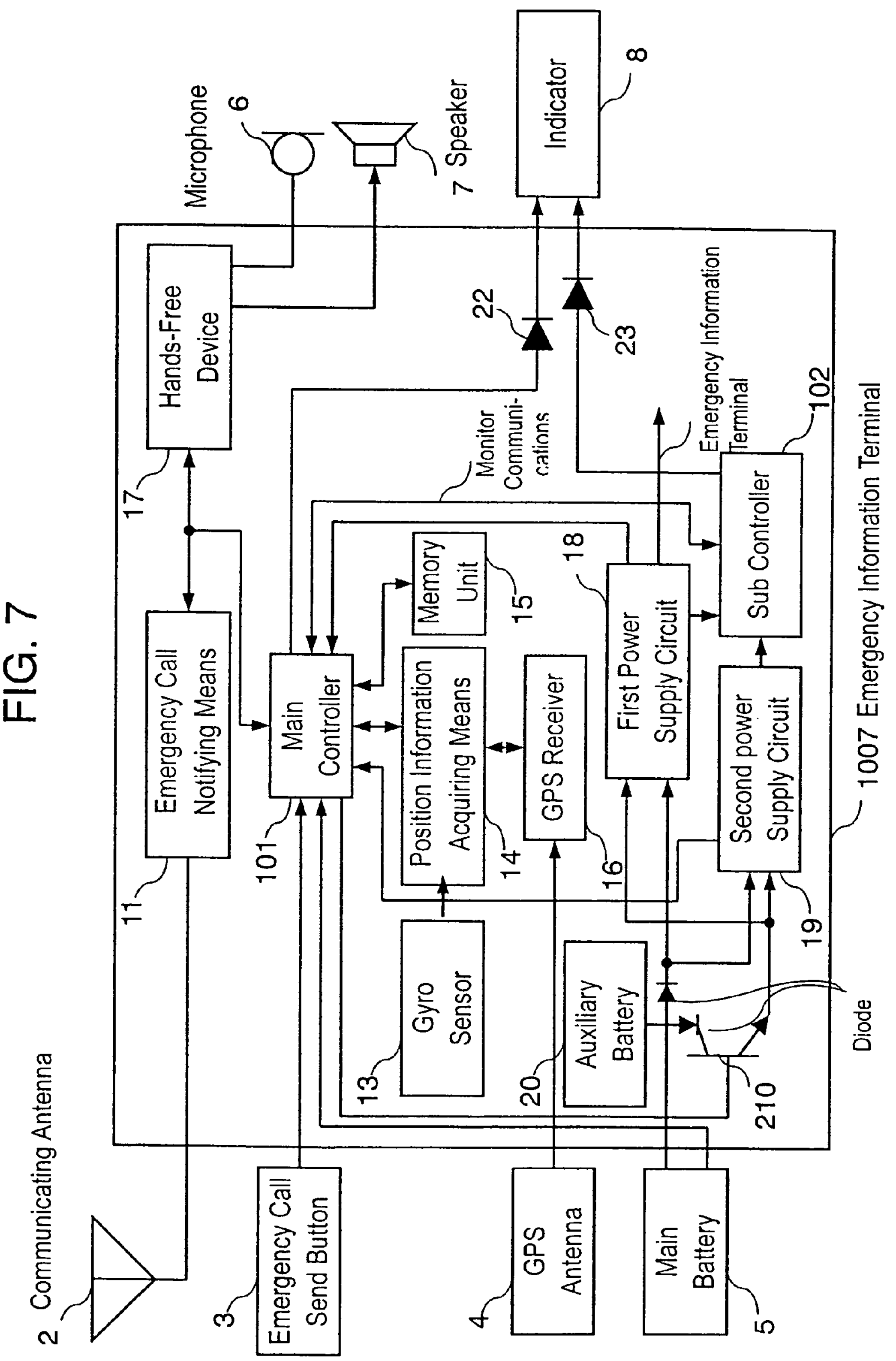
FIG. 7 is a block diagram of an emergency information terminal according to embodiment 7 of the invention.

FIG. 7 shows an emergency information terminal in embodiment 7 of the invention. The terminal includes two power supply circuits for feeding power. The main battery usually supplies power to first power supply circuit and second power supply circuit. When the main controller monitoring the supply voltage signal of the main battery detects abnormality of the main battery, power is supplied into the first power supply circuit and second power supply circuit from the auxiliary battery in the emergency information terminal. Further, the first power supply circuit supplies power to all internal circuits of the terminal including the main controller, and the second power supply circuit supplies power to the sub controller.

In FIG. 7, the main battery 5 supplies power to the first power supply circuit 18 and second power supply circuit 19. The first power supply circuit 18 drops the voltage of the main battery 5, and supplies power to the main controller 101. The second power supply circuit 19 drops the voltage of the main battery 5, and supplies power to the sub controller 102. The main controller 101 and sub controller 102 have functions realized by the software for controlling the microcomputer, and execute mutual monitoring process. For monitoring, a system operation detection request and corresponding return of response signal may be monitored mutually by serial signals. When the request signal is not received for a predetermined time, or when the response signal is not received for a predetermined time, the main controller and sub controller mutually recognize to be abnormal. The main controller 101 monitors a voltage of the main battery 5. When voltage drop or other abnormality is detected, a transistor 210 is controlled to supply power from an auxiliary battery 20.

The auxiliary battery 20 supplies power to the first power supply circuit 18 and second power supply circuit 19, so that the terminal 1007 can continue operation. The main controller 101 lights or flickers the indicator 8 to tell the user that the power is supplied from the auxiliary battery 20.

Due to power failure of the first power supply circuit 18 or abnormality of the main controller 101, if periodic communication between the controllers cannot be executed, the sub controller 102 judges abnormality of the main controller 101, and lights or flickers the indicator 8 to inform the user.

Due to power failure of the second power supply circuit 19 or abnormality of the sub controller 102, if periodic communication between the controllers cannot be executed, the main controller 101 judges abnormality of the sub controller 102, and lights or flickers the indicator 8 to inform the user.

Voltage monitoring of the main battery 5, and power supply control from the auxiliary battery 20 may be executed by the sub controller 102. Or, from both main controller 101 and sub controller 102, control by logic sum (OR) may be executed.

In the explanation of the foregoing embodiments, abnormality is notified to the user by controlling to light or flicker the indicator 8 as the illuminating device. Besides, abnormality may be also notified to the user with, for example, liquid crystal screen or other display device. Or the buzzer or other sounding device may be also used for noticing abnormality to the user, or voice reproducing device for pronouncing a predetermined statement may be used for informing the user of abnormality.

When abnormality is detected, not only controlling the indicator, but also the detection time, number of times, and failure description are recorded in the memory unit, so that the cause of abnormality can be analyzed easily.

Embodiment 8

In the emergency information terminal of embodiment 8 of the invention, the power source circuit for supplying power to internal circuits of the terminal and the power source circuit for the external device are separated. Due to failure of the external device or short-circuiting of the power supply line to the external device, if current loss or voltage drop more than a predetermined voltage occurs, the terminal has an operation maintained by preventing voltage drop of power source to the inside.

Figure 8:
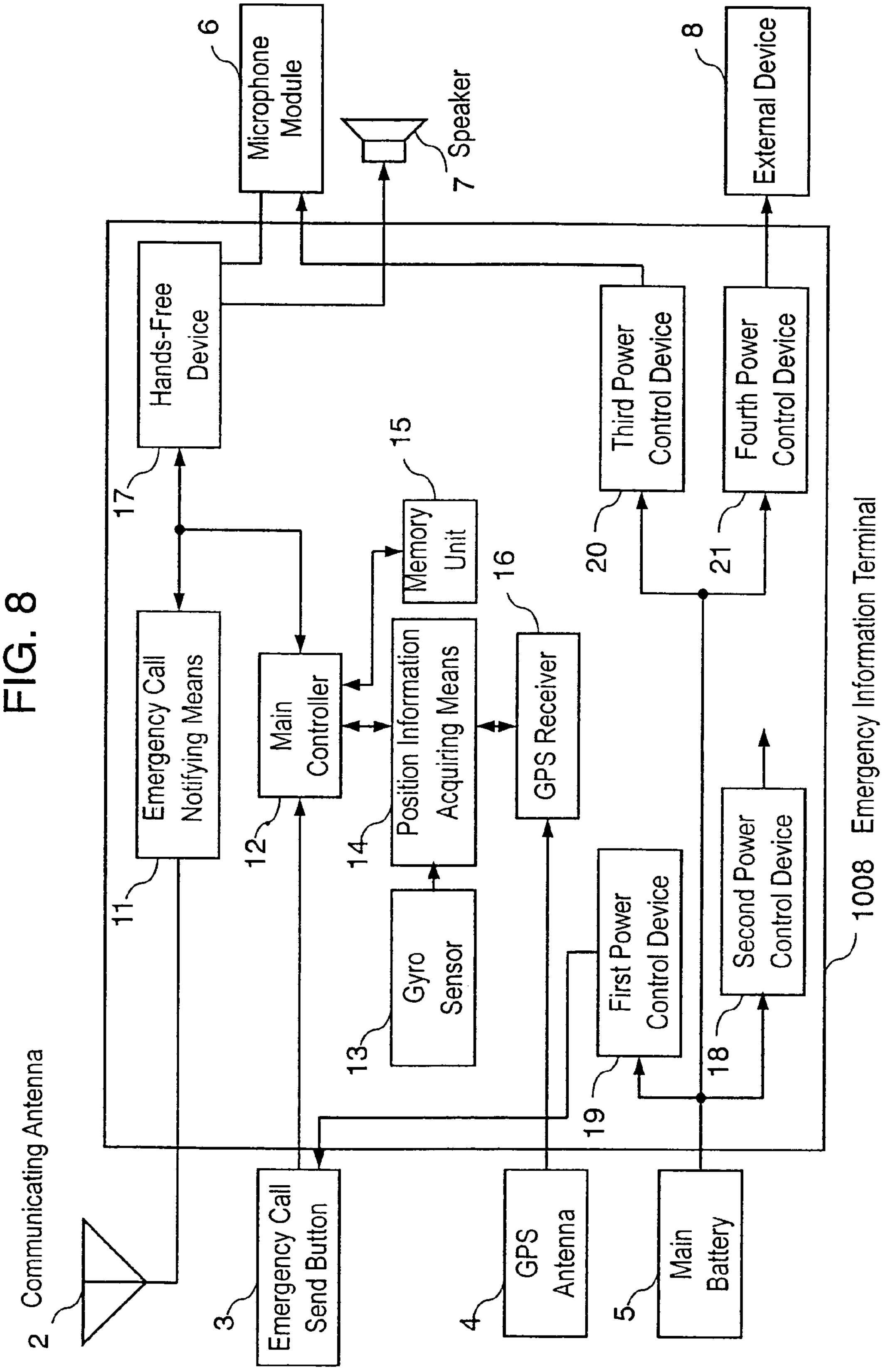
FIG. 8 is a block diagram of an emergency information terminal according to embodiment 8 of the invention.

FIG. 8 is a block diagram of an emergency information terminal 1008 in embodiment 8 of the invention. The emergency information terminal 1008, which is mounted in a car or other vehicle, transmits data of present position information of the vehicle or registered vehicle to the center supervising the emergency information system such as police or emergency information center in case of emergency such as traffic accident or sickness, and requests dispatch of emergency vehicle. Through a communicating antenna 2, the terminal 1008 sends a transmission signal from emergency call notifying means 11 to a base station of the communication operator, and issues a signal received from the communication operator to the emergency call notifying means 11. An emergency call send button 3, which is pressed by the user in case of emergency such as traffic accident or sickness, generates a signal for starting processing of emergency call transmission. A GPS antenna 4 receives data from a GPS satellite. A main battery 5 supplies power to the electric appliances in the vehicle, and also supplies power to the emergency information terminal 1008. A microphone module 6 incorporates a microphone for sending the user's voice to the emergency information terminal 1008 when notifying voice talk of emergency call notifying process, and an amplifying circuit and others. A speaker 7 outputs a voice signal received from the emergency information center when notifying the voice talk. A handset telephone for ordinary voice talk except for emergency call notifying process is shown as an external connection device 8. The external device 8 is operated with a power supplied from the emergency information terminal 1008.

In the emergency information terminal 1008, the emergency call notifying means 11, upon receiving a call request signal from a controller 12, starts telephone call process to the destination corresponding to the telephone number, according to the telephone number entered from the controller 12, through the base station of the communication operator. When receiving a response from the destination or a signal transferring to talk such as busy signal, the emergency call notifying means 11 is transferred under the voice talk control or data communication control, and issues a signal notifying the transfer under talk control to the controller 12. The vehicle running direction, position information and other data entered from the controller 12 are transmitted to the center supervising the emergency information system such as police or emergency information center or the destination corresponding to the telephone number through the base station of the communications operator or the like.

The controller 12 records the data such as position information acquired from a position information acquisition processor 14 in a memory unit 15. From an operation signal from the emergency call send button 3, the controller 12 recognizes an emergency call request, and acquires the data of position information or the like which is acquired from the position information acquisition processor 14 and recorded in the memory unit 15. Further, the telephone number of the center supervising the emergency call system such as police or emergency information center is obtained from the memory unit 15. With this telephone number, a telephone call is requested to the emergency call notifying means 11. Further, when receiving a response signal from the destination corresponding to the telephone number or a signal transferring to talk such as busy signal through the emergency call notifying means 11, the controller 12 recognizes a transfer to talk state. Moreover, a signal for transmitting the position information and history data obtained from the position information acquisition processor 14 to the center for supervising the emergency information system or the destination corresponding to the telephone number is issued to the emergency call notifying means 11 through the base station of the communication operator or the like.

A gyro sensor 13 generates data of a vehicle running direction or the like. The position information acquisition processor 14 issues the data from the gyro sensor 13, and issues the position information and other data generated from the data received from the GPS antenna 4 by a GPS receiver 16 to the controller 12. The memory unit 15 records the telephone number of the center for supervising the emergency information system such as police or emergency information center, the registration number of the vehicle mounting the emergency information terminal 1008, position information generated in the position information acquisition processor 14 and other information. The memory unit 15 issues the recorded data according to a request signal from the controller 12. The GPS receiver 16 issues the position and other data to the position information acquisition processor 14 according to the data obtained from the GPS antenna 4. A hands-free device 17, to realize hands-free voice talk in case of emergency call notifying process, executes echo canceling process and howling preventing process for on the transmission voice signal from the user in voice talk and the voice signal of the voice signal received from emergency information center.

A first power control device 18 supplies power to an internal circuit of the emergency information terminal 1008. A second power control device 19 supplies power to a lighting device of an emergency call send button 3 connected to the emergency information terminal 1008 which has a function of judging abnormality and cutting off power supply if outputting a current over a predetermined level flows or the voltage drops less than or equal to a predetermined level. A third power control device 20 supplies power to a microphone module 6 connected to the emergency information terminal 1008. A third power control device 20 judges abnormality and cuts off power supply if outputting a current over a predetermined level flows or the voltage drops less than or equal to a predetermined level. A fourth power control device 21 supplies power to an external connection device 8 connected to the terminal 1008, and judges abnormality and cuts off power supply if outputting a current over a predetermined level flows or the voltage drops less than or equal to a predetermined level.

An operation of the emergency information terminal in embodiment 8 of the invention having such configuration will be explained below. In FIG. 8, the position information acquisition processor 14 generates position data with the data from the gyro sensor 13 and the data received in the GPS receiver 16 from the GPS antenna 4. The controller 12 periodically acquires position information and other data from the position information acquisition processor 14, and records the data in the memory unit 15.

The user presses the emergency call send button 3 in case of emergency such as traffic accident or sickness. When being pressed, the emergency call send button 3 issues a corresponding signal to the controller 12. The controller 12, upon recognizing an emergency call send request by the signal from the send button 3, starts emergency call notifying process. The emergency call notifying process may starts by detecting operation of impact sensor, air bag sensor, or tumble sensor as a trigger.

The controller 12 acquires the position information, telephone number of the center supervising the emergency information system such as police and emergency information center and other data stored in the memory unit 15, and requests telephone call to the emergency call notifying means 11 with the telephone number. Through the communicating antenna 2, the emergency call notifying means 11 starts telephone call process to the destination corresponding to the telephone number through the base station of the communication operator or the like.

The emergency call notifying means 11, when receiving a response from the destination or a signal transferring to talk such as busy signal, recognizes the transfer to talk state, transfers under the voice talk control or data communication control, and issues a signal telling the transfer to talk to the controller 12. The controller 12, upon judging the talk is successful, transmits the data such as the present position, running history information, device ID, registration number, registered vehicle name and others to the center or the destination corresponding to the telephone number, that is, the center supervising the emergency information system such as police and emergency information center through the base station of the communication operator or the like.

The center, when receiving all position information data from the emergency information terminal 1008, changes to voice talk. The emergency call notifying means 11 incorporated in the emergency information terminal 1008 receives a signal telling the change to the voice talk, and issues this signal to the controller 12. The controller 12 receives the signal, and controls to connect the voice path of the emergency call notifying means 11 and hands-free device 17, and transfers to the voice talk notifying process.

In voice talk notifying process, the emergency call notifying means 11 issues the voice signal received from the center to the hands-free device 17. The hands-free device 17 processes the received voice signal by echo canceling or howling prevention control, and further amplifies the signal level, and issues to the speaker 7. The speaker 7 outputs the received voice signal entered from the hands-free device 17 to the user.

The microphone module 6 generates a voice signal from the voice of the user, and issues the signal to the hands-free device 17. The hands-free device 17 processes the transmission voice signal by echo canceling or howling prevention control, and issues the signal to the emergency call notifying means 11. The emergency call notifying means 11 receives the voice signal from the hands-free device 17, and transmits the signal to the center supervising the emergency information system such as emergency information center.

The emergency information terminal 1008 supplies power to the emergency call send button 3, microphone module 6, and external connection device 8 such as handset. Aside from the first power control device 18 for supplying power to the emergency information terminal 1008, the second power control device 19 supplies power to the emergency call send button 3, the third power control device 20 supplies power to the microphone module 6, and the fourth power control device 21 supplies power to the external connection device 8.

In the event of abnormality in the power supply line for feeding power to the emergency call send button 3, microphone module 6, and external connection device 8 connected to the outside of the emergency information terminal 1008, the second power control device 19 to fourth power control device 21 are limited at constant current or cancels the power supply.

The power supply to the inside of the emergency information terminal 1008 and the power supply to the external devices connected to the outside are separated. Therefore, even if the power supply line to the external device is short-circuited in the event of traffic accident or the like, the power supply to the emergency information terminal 1008 can be continued. Therefore, regardless of abnormality of the external device, the operation of the terminal 1008 is maintained, and emergency call notifying process can be executed.

Embodiment 9

In the emergency information terminal of embodiment 9 of the invention, the power supply line for feeding power to the external device connected to the outside shuts off the power source when being short-circuited due to abnormality such as traffic accident or other trouble.

Figure 9:
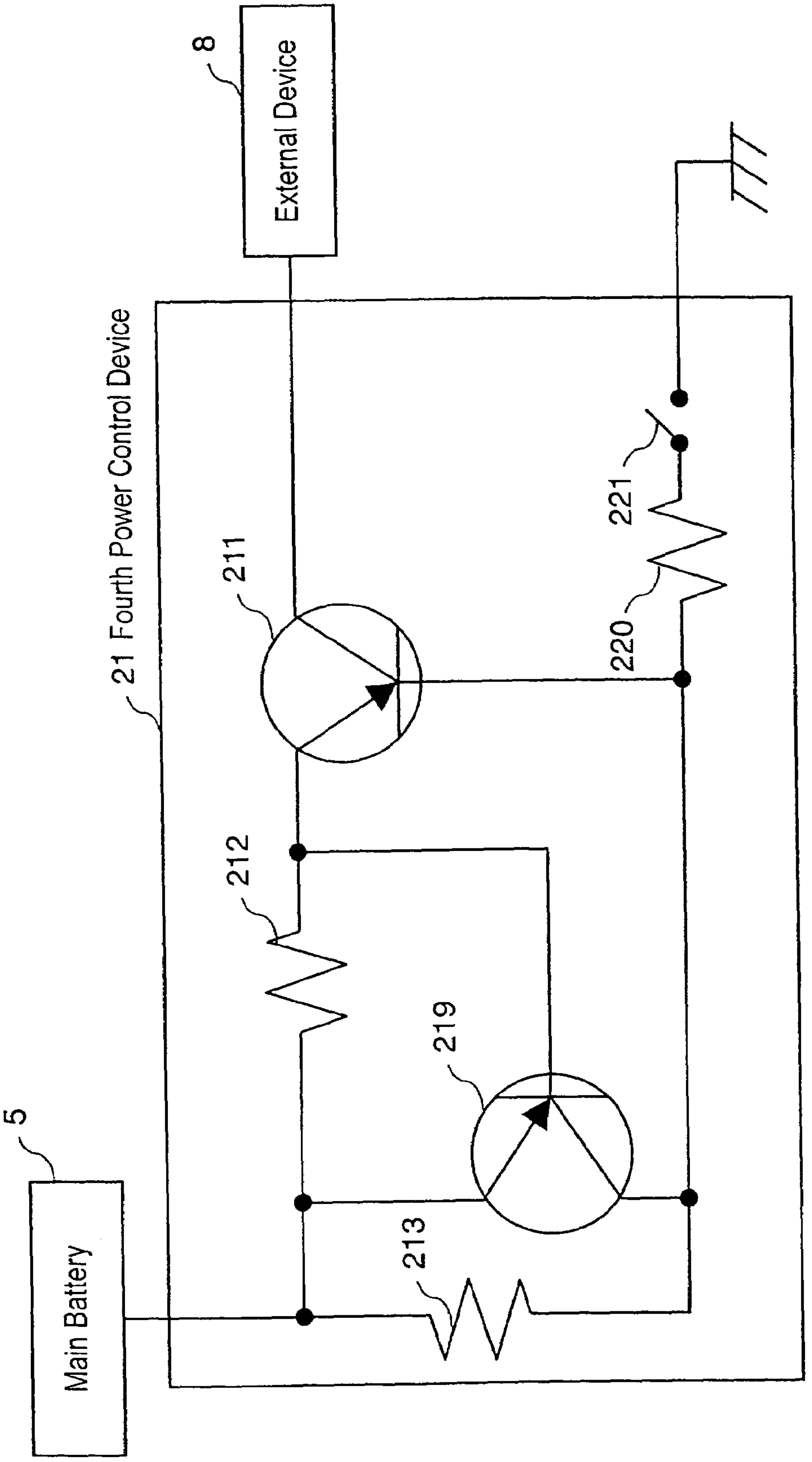
FIG. 9 is a block diagram of a power source control device of an emergency information terminal according to embodiment 9 of the invention.

FIG. 9 is a block diagram of a fourth power control device for feeding power to the external device of the emergency information terminal 1008. The main battery 5 and external device 8 are the same as shown in FIG. 8. A transistor 211 feeds the power from the main battery 5 into the external device 8. A resistor 212 for detecting the current has a relatively low resistance in consideration of power drop of supply voltage. When a switch 221 is turned on, a base of the transistor 211 is pulled down by a resistor 220. The main battery 5 feeds power to one end of the resistor 212, and supplies power to an emitter of the transistor 211 through the resistor 212. The transistor 211, as having the base pulled down, issues power source to the emitter, and supplies power to the external device 8. The external device 8 such as the handset is operated by this power source.

In the event of abnormality such as short circuit in the power supply line to the external device 8, a large current flows in the resistor 212, and a potential is generated at both ends of the resistor 212. With the large current, the voltage drop by the resistor 212 lowers the base potential of the transistor 219, and turns on the transistor 219. As the transistor 219 is turned on, the transistor has a base pulled up and has a collector and emitter cut off, and therefore, power supply to the external device 8 is cut off. A resistor 213 connects the main battery and the base of the transistor 211.

As described in above, if the power supply line to the external device is short-circuited in the event of traffic accident or the like, the power source is cut off, and the power supply to the emergency information terminal can be prevented from an influence. Therefore, the operation of the emergency information terminal is maintained, and emergency call notifying process can be executed.

Embodiment 10

In the emergency information terminal of embodiment 10 of the invention, the power source is cut off if the power supply line for feeding power to the external device connected to the outside is short-circuited due to abnormality such as traffic accident or other trouble.

Figure 10:
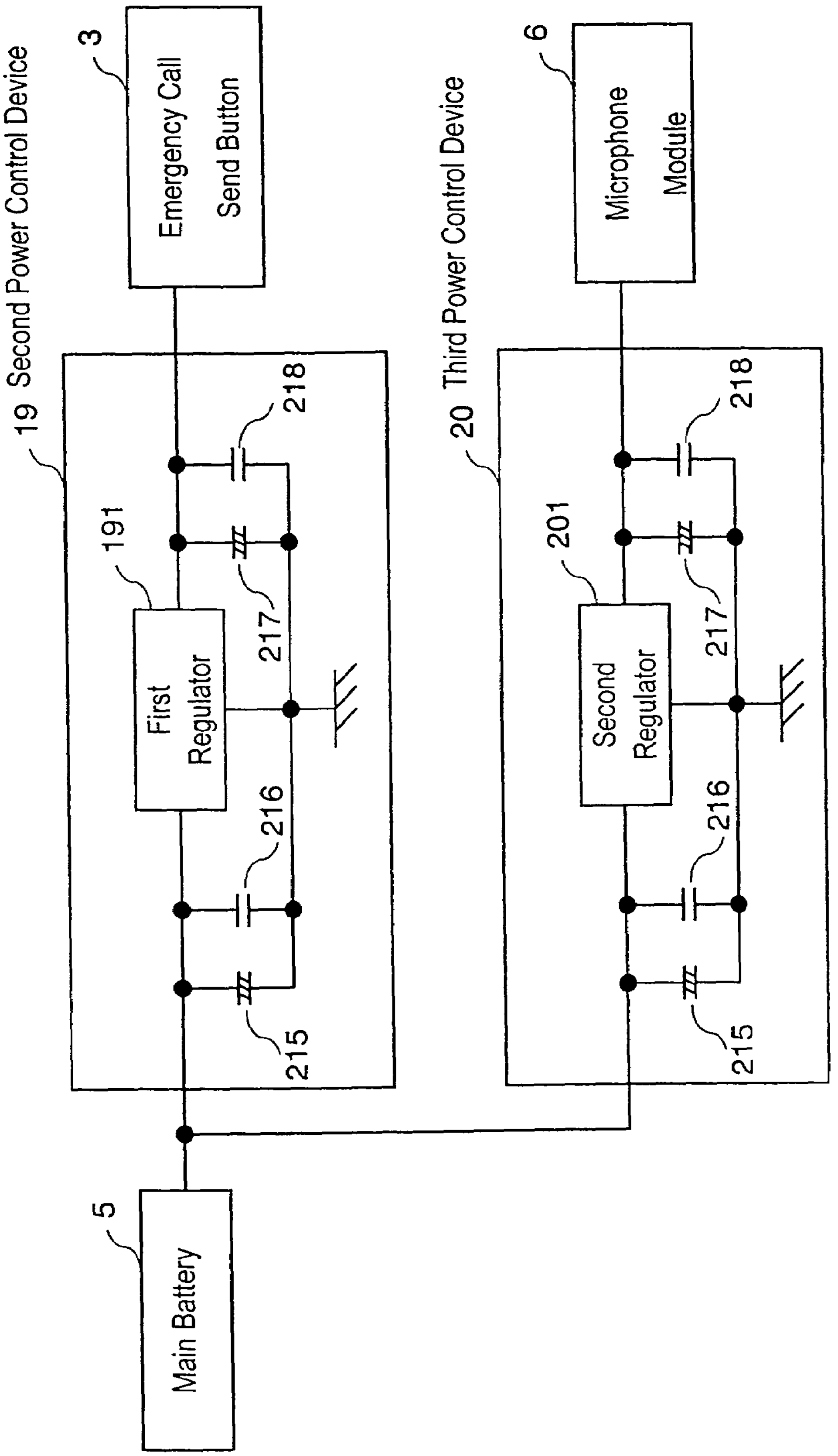
FIG. 10 is a block diagram of a power source control device of an emergency information terminal according to embodiment 10 of the invention.

FIG. 10 is a block diagram of a second power control device 19 for feeding power to the microphone module 6, and a third power control device 20 for feeding power to the illuminating device for lighting up the emergency call send button 3.

In FIG. 10, the emergency call send button 3, main battery 5, microphone module 6, second power control device 19, and third power control device 20 are the same as shown in FIG. 8.

The second power control device 19 and third power control device 20 incorporates regulators 191 and 201 of a constant current type, respectively. The regulator 191 supplies power to the illuminating device for lighting up the emergency call send button 3. The regulator 201 supplies power to the microphone module 6 from which a voice signal is acquired at a hands-free voice talk. Further, in the event of short circuit of the power supply line to the emergency call send button 3 and microphone module 6 due to traffic accident or other trouble, the regulator 191 and regulator 201 supply a predetermined current output. As a result, the main battery 5 is prevented from a drop of potential, and the operation of the terminal 1008 can be continued. The regulator 191 and regulator 201 additionally having thermal shutoff function can cut off the power source by the own heat generation if the regulators are heated due to abnormal output of current. Therefore, the output of the main battery 5 is not short-circuited, and the potential is held, and the operation of the terminal 1008 is maintained.

As described in above, the power supply to the inside of the emergency information terminal and the power supply to the devices connected to the outside such as the emergency call send button and microphone are separated. And a power cut-off function for case of abnormality is provided in the power control device for feeding power to the external devices. Therefore, regardless of trouble of the external device or short circuit or other abnormality of the power supply line, the operation of the emergency information terminal is maintained, and emergency call notifying process can be executed.

INDUSTRIAL APPLICABILITY

The invention presents an emergency information terminal, as including two power supply circuits, is enabled to continue operation by other power supply circuit even if one power supply circuit fails to feed power.

The invention presents an emergency information terminal including a power control device for feeding power to external devices and a power control device for feeding power to internal circuits of emergency information terminal. The power control device for feeding power to external devices has a power cut-off function in the event of abnormality, so that the operation of the terminal can be continued in the event of trouble of external device or short circuit or other abnormality of power supply line.

What is claimed is:

1. An emergency information terminal mounted in a vehicle having a main battery, said emergency information terminal being capable of connecting an external device, for executing an emergency call notifying process to a center supervising an emergency information system, said emergency information terminal comprising:

first and second power supply circuits for supplying power, said first power supply circuit and said second power supply circuit are coupled to said main battery in parallel;

a sub controller operable to control communications with said external device; and a main controller operable to control other than the communications with said external device, wherein said first power supply circuit supplies power to said main controller and sub controller, and wherein said second power supply circuit supplies power to said main controller and sub controller when said main controller detects abnormality of said first power supply circuit.

2. The emergency information terminal of claim 1, further comprising an auxiliary battery, wherein said main battery usually supplies power to said first and second power supply circuits, wherein said main controller and sub controller are operable to monitor each other, wherein said main controller is operable to monitor an output voltage of said main battery, and wherein said auxiliary battery supplies power to said first and second power supply circuits when said main controller detects abnormality in the output voltage of said main battery.

3. The emergency information terminal of claim 2, wherein said main controller is operable to inform a user that said auxiliary battery supplies power to said first and second power supply circuits by controlling an indicator to light or flicker.

4. The emergency information terminal of claim 2, wherein said main controller and sub controller are operable to communicate each other, and wherein said sub controller is operable to detect abnormality in said main controller when failing to communicate with said main controller, and to inform a user of the abnormality by controlling an indicator to light or flicker.

5. The emergency information terminal of claim 2, wherein said main controller and sub controller are operable to communicate each other, and wherein said main controller is operable to detect abnormality in said sub controller when failing to communicate with said sub controller, and to inform a user of the abnormality by controlling an indicator to light or flicker.

6. An emergency information system comprising:

an emergency information terminal mounted in a vehicle having a main battery, said emergency information terminal including:

a first power supply circuit coupled to said main battery for supplying power;

a second power supply circuit coupled to said main battery for supplying power; and an emergency information center for receiving an emergency call signal from said emergency information terminal;

wherein said first power supply circuit and said second power supply circuit are coupled to said main battery in parallel.

7. An emergency information terminal mounted in a vehicle having a main battery, for executing an emergency call notifying process to a center supervising a emergency information system, said emergency information terminal comprising:

a first power supply circuit coupled to said main battery for supplying power;

an auxiliary battery; and a second power supply circuit coupled to said auxiliary battery for supplying power, said second power supply circuit being separate from said first power supply circuit.

8. The emergency information terminal of claim 7, wherein said first power supply circuit usually supplies power, and wherein said second power supply circuit supplies power if power supply from said main battery is interrupted.

9. An emergency information system comprising:

an emergency information terminal mounted in a vehicle having a main battery, including a first power supply circuit coupled to said main battery for supplying power;

an auxiliary battery; and a second power supply circuit coupled to said auxiliary battery for supplying power, said second power supply circuit being separate from said first power supply circuit; and an emergency information center for receiving an emergency call signal from said emergency information terminal.

* * * * *